US009988177B1

(12) United States Patent
Ruprecht

(10) Patent No.: US 9,988,177 B1
(45) Date of Patent: Jun. 5, 2018

(54) BOTTLE WITH FILTER AND INFUSION BASE

(71) Applicant: Rapid Pure Inc, Lakeland, MN (US)

(72) Inventor: John Ruprecht, Lakeland, MN (US)

(73) Assignee: Rapid Pure Inc, Lakeland, MN (US)

( * ) Notice: Subject to any disclaimer, the term of this patent is extended or adjusted under 35 U.S.C. 154(b) by 0 days. days.

(21) Appl. No.: 15/215,899

(22) Filed: Jul. 21, 2016

Related U.S. Application Data

(60) Provisional application No. 62/302,928, filed on Mar. 3, 2016, provisional application No. 62/200,345, filed on Aug. 3, 2015.

(51) Int. Cl.
B65D 1/04 (2006.01)
B65D 1/06 (2006.01)
B65D 8/00 (2006.01)
B65D 6/24 (2006.01)
B65D 47/06 (2006.01)
B65D 47/12 (2006.01)
B65D 51/24 (2006.01)
B65D 51/28 (2006.01)
A47G 19/22 (2006.01)

(52) U.S. Cl.
CPC .......... *B65D 11/04* (2013.01); *B65D 11/1866* (2013.01); *B65D 47/065* (2013.01); *B65D 47/122* (2013.01); *B65D 51/249* (2013.01); *B65D 51/28* (2013.01); *B65D 2547/063* (2013.01)

(58) Field of Classification Search
CPC ...... B65D 23/04; B65D 1/04; B65D 23/0042; B65D 43/02; B65D 47/06; B65D 51/24; B65D 79/005; B65D 11/1866; B65D 47/065; B65D 47/122; B65D 51/249; B65F 11/04; A47G 21/01; A45F 3/20; A45F 2003/163
USPC ............ 220/705, 709, 706; 206/6, 388, 389; 215/6, 388, 389
See application file for complete search history.

(56) References Cited

U.S. PATENT DOCUMENTS

| 928,002 A | 7/1909 | Paalen |
| 3,927,782 A | 12/1975 | Edwards |
| 4,326,638 A | 4/1982 | Nickel |
| 4,419,235 A | 12/1983 | Sway |
| 4,494,668 A * | 1/1985 | Lottick ............ A47G 19/2266 215/229 |
| 4,529,511 A | 7/1985 | Breeden et al. |

(Continued)

*Primary Examiner* — J. Gregory Pickett
*Assistant Examiner* — Niki M Eloshway
(74) *Attorney, Agent, or Firm* — Mai-Tram D. Lauer; Westman Champlin & Koehler, P.A.

(57) ABSTRACT

A bottle assembly includes a cap assembly, a bottle body, a base assembly and a filter assembly. The cap assembly includes a straw. The bottle body is removably connectable to the cap assembly. The base assembly is removably connectable to the bottle body. The filter assembly is connectable to the bottle body, and the filter assembly includes an aperture configured for passage of a portion of the straw. The aperture includes a mechanism that is closable when the portion of the straw is not in the aperture. A method of using a bottle includes removing the cap assembly from an upper opening of the bottle body and introducing fluid into the upper opening of the bottle body and through a filter assembly, the filter assembly including an aperture configured for passage of a portion of the straw. The method also includes closing the aperture.

20 Claims, 12 Drawing Sheets

(56) References Cited

U.S. PATENT DOCUMENTS

| | | |
|---|---|---|
| 4,573,604 A | 3/1986 | Guim |
| D283,308 S | 4/1986 | Oakley |
| 4,605,499 A | 8/1986 | Wise |
| D307,721 S | 5/1990 | Barth |
| D310,028 S | 8/1990 | Brandt |
| D312,784 S | 12/1990 | Cochran |
| D315,505 S | 3/1991 | Cornell |
| 5,219,525 A | 6/1993 | Harrison |
| 6,004,460 A | 12/1999 | Palmer et al. |
| D454,498 S | 3/2002 | Darr |
| 6,372,270 B1 | 4/2002 | Denny |
| D459,658 S | 7/2002 | Darr |
| 6,595,380 B2 | 7/2003 | Silvers |
| D586,186 S | 2/2009 | Bhavnani |
| D595,581 S | 7/2009 | Brunson |
| D599,208 S | 9/2009 | Kissinger |
| D606,410 S | 12/2009 | Kissinger |
| D633,803 S | 3/2011 | Murphy |
| 7,914,165 B2 | 3/2011 | Bertken |
| 8,011,166 B2 | 9/2011 | Sheets |
| D647,210 S | 10/2011 | Wilkinson |
| D650,677 S | 12/2011 | Wurster |
| 8,142,654 B2 | 3/2012 | Kohl |
| 9,045,353 B2 | 6/2015 | Parekh et al. |
| 9,420,907 B2 | 8/2016 | Ni |
| D772,713 S | 11/2016 | Chapman |
| 2003/0213803 A1* | 11/2003 | Chasteen ............ B65D 17/507 220/229 |
| 2005/0230406 A1* | 10/2005 | Maravich ............ B65D 1/265 220/792 |
| 2008/0025018 A1 | 1/2008 | Sandy |
| 2010/0219151 A1* | 9/2010 | Risheq .................. C02F 1/002 215/44 |
| 2010/0300904 A1* | 12/2010 | Sharon ............ B65D 81/3205 206/222 |
| 2011/0233118 A1* | 9/2011 | Nelson ............... B05B 11/3001 210/117 |
| 2011/0278314 A1* | 11/2011 | Bendix ................. B65D 47/06 220/703 |
| 2012/0012617 A1* | 1/2012 | Gill .......................... A45F 3/20 222/212 |
| 2013/0020334 A1 | 1/2013 | Chiou |
| 2013/0153530 A1 | 6/2013 | Boukobaz |
| 2013/0206717 A1* | 8/2013 | Lane ...................... A47J 31/18 215/6 |
| 2014/0099423 A1* | 4/2014 | Furrow .............. A47G 19/2222 426/590 |
| 2014/0204565 A1 | 7/2014 | Zwierstra |
| 2014/0217056 A1* | 8/2014 | Parekh .................... A45F 3/16 215/228 |
| 2015/0239255 A1* | 8/2015 | Tsukida .............. B41J 2/17566 347/7 |
| 2017/0073110 A1 | 3/2017 | Campbell |
| 2017/0232406 A1* | 8/2017 | Waggoner ............ B01F 3/0865 |

\* cited by examiner

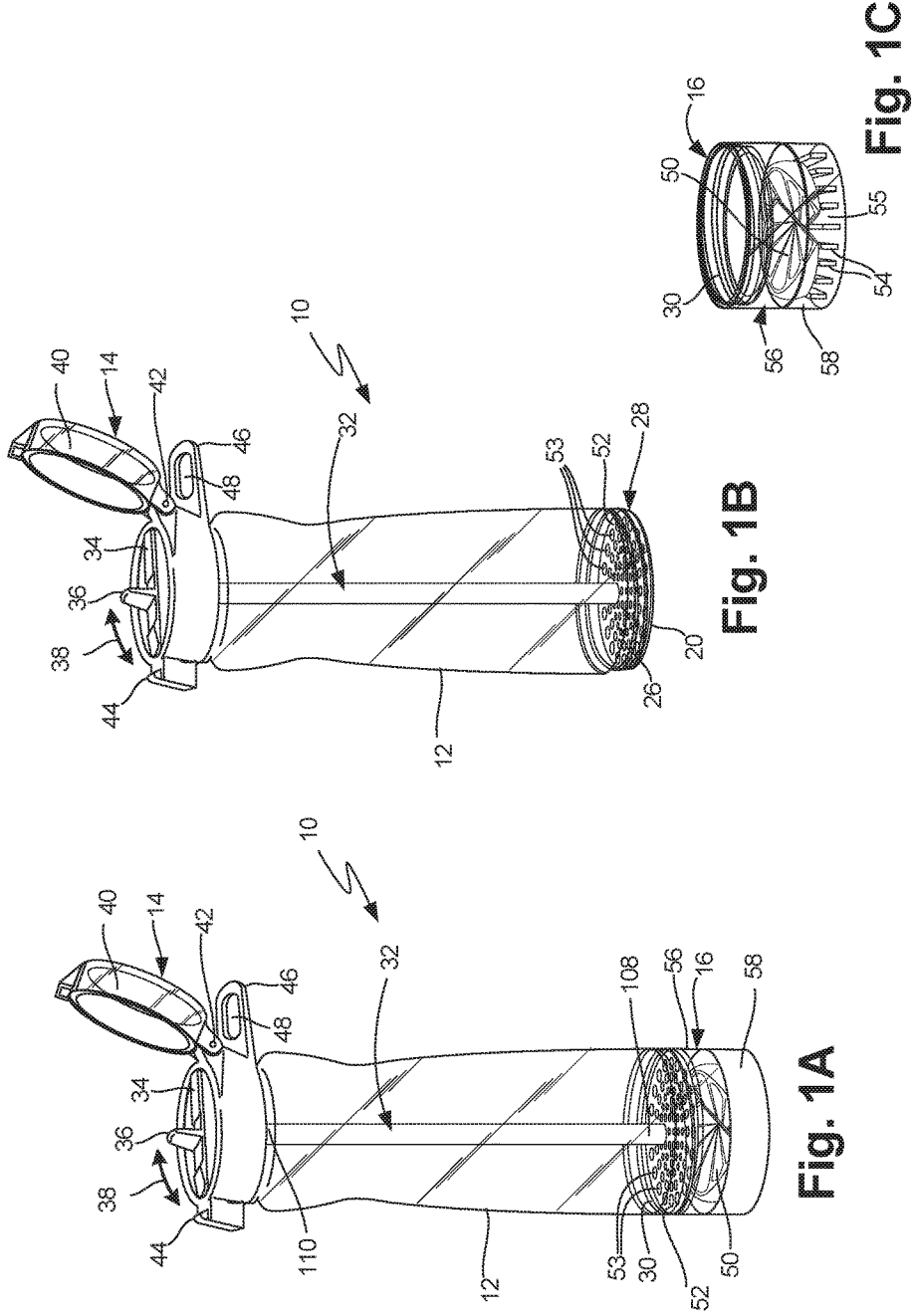

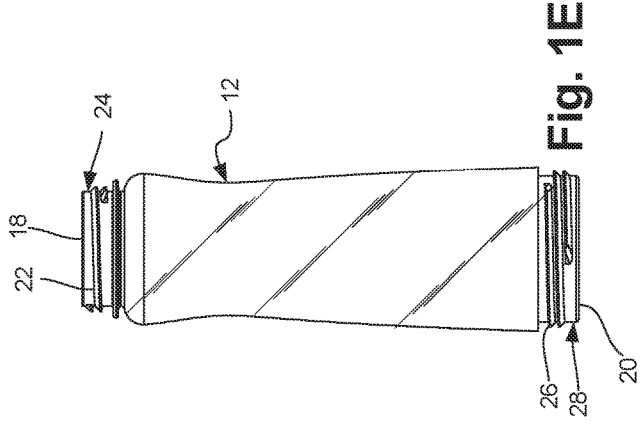
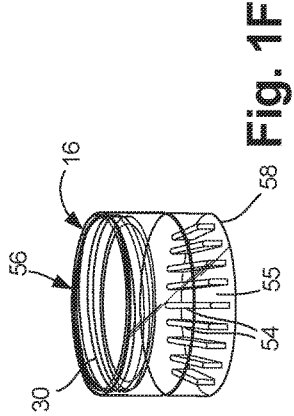
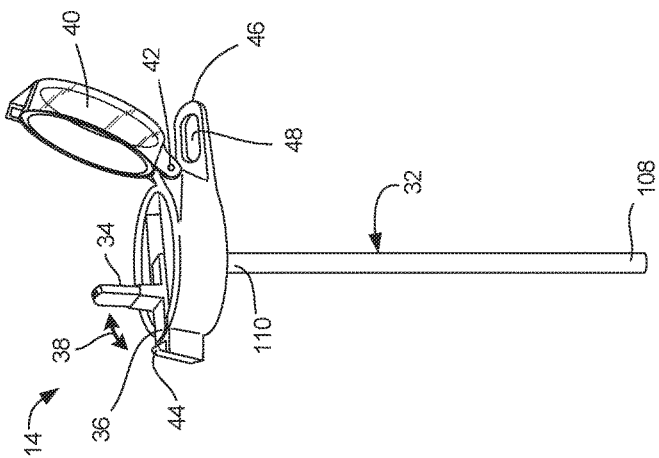

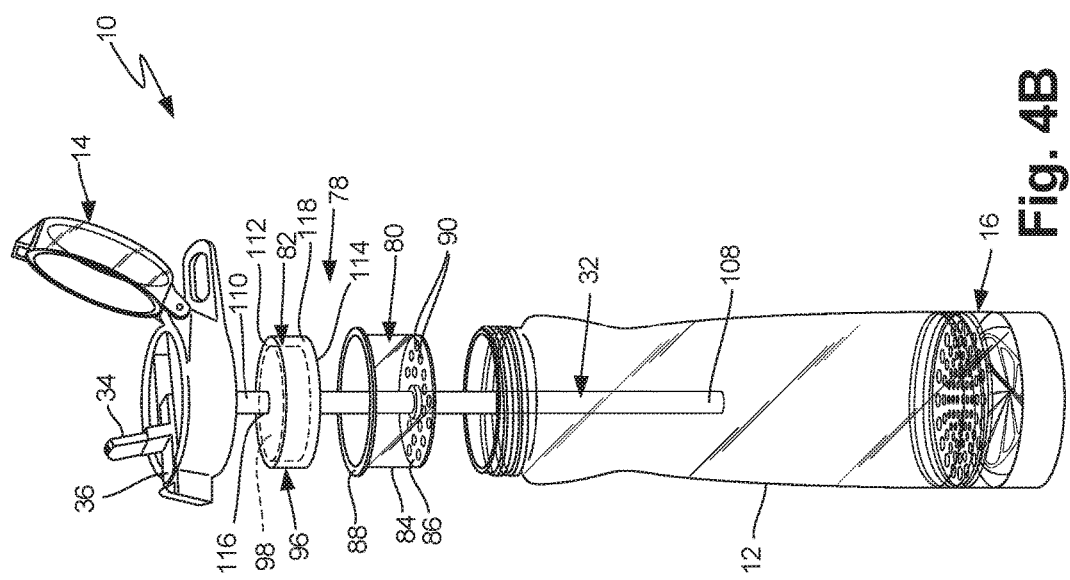
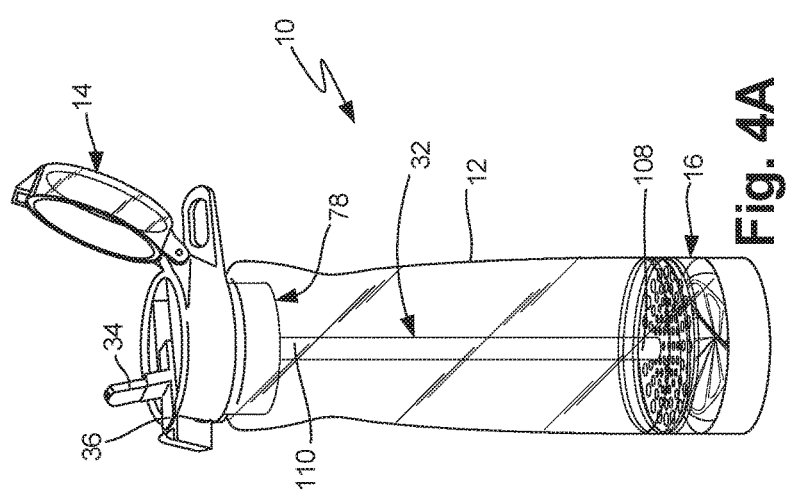

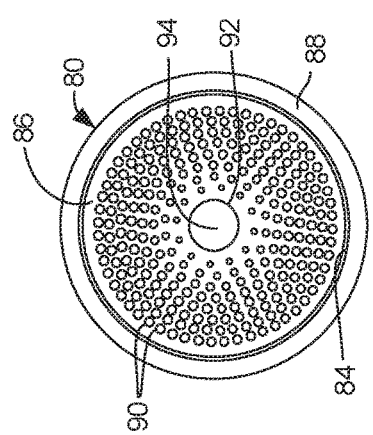
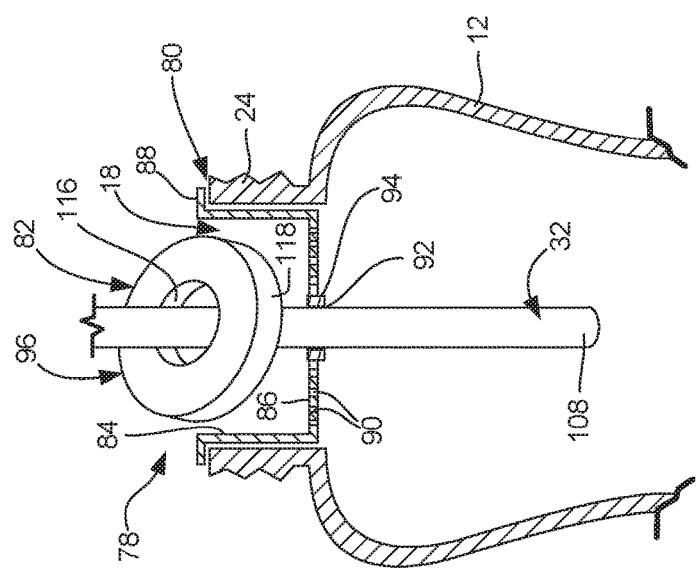
Fig. 4D
Fig. 4C

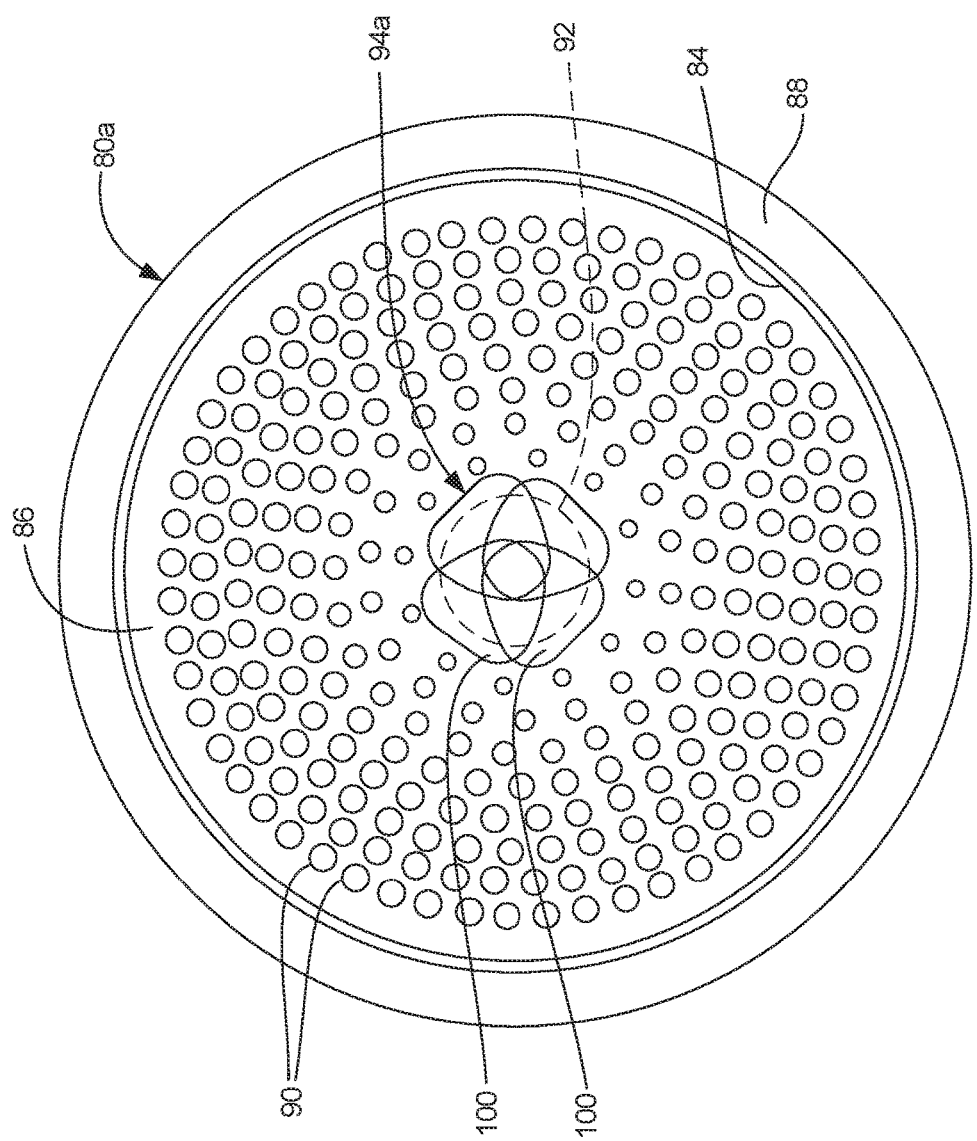

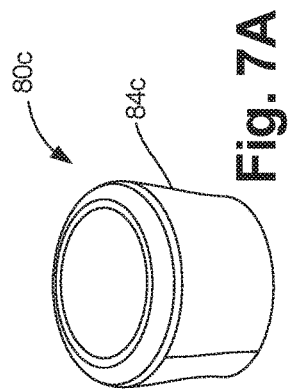
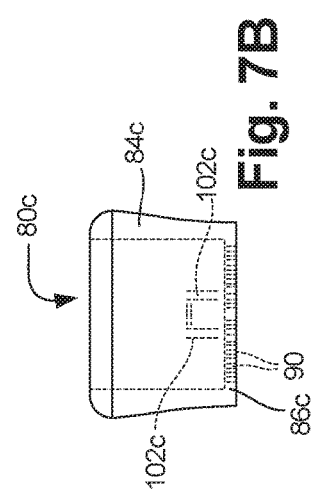
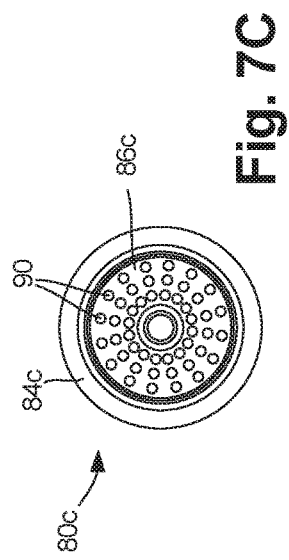
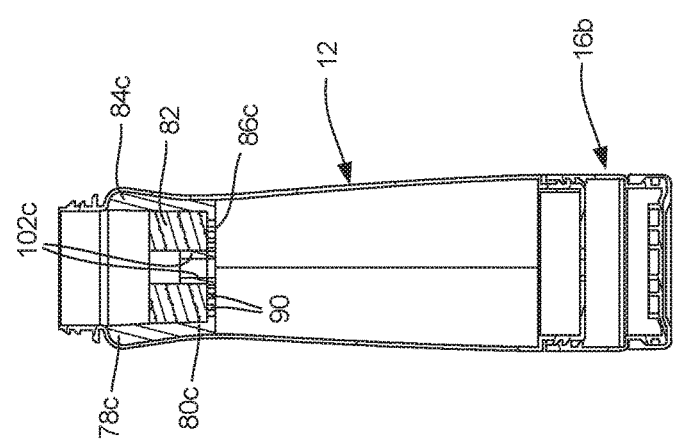

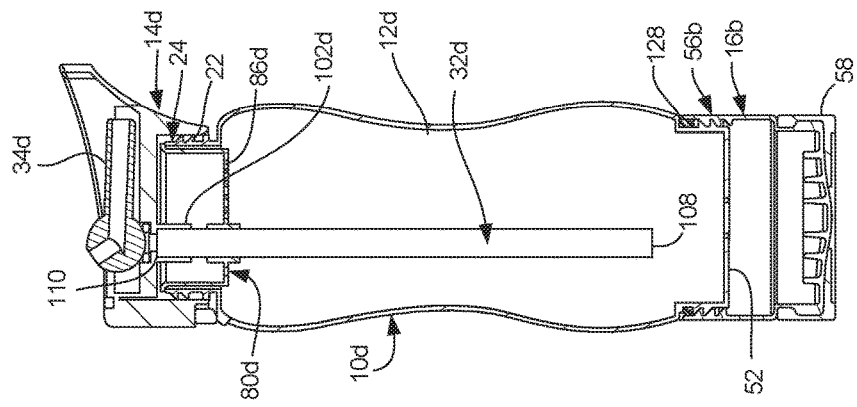
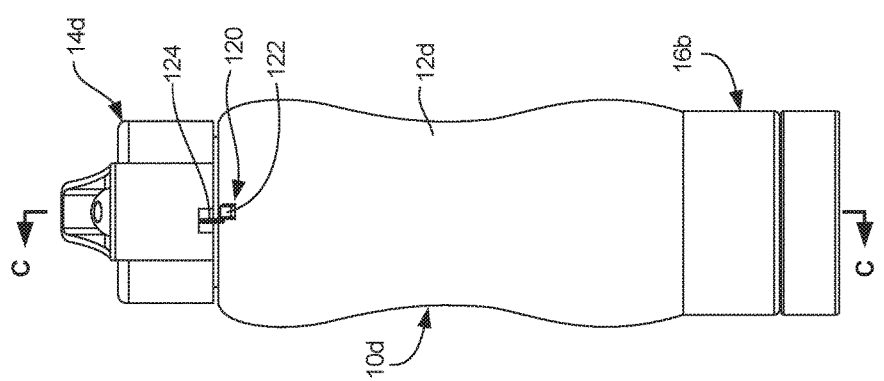
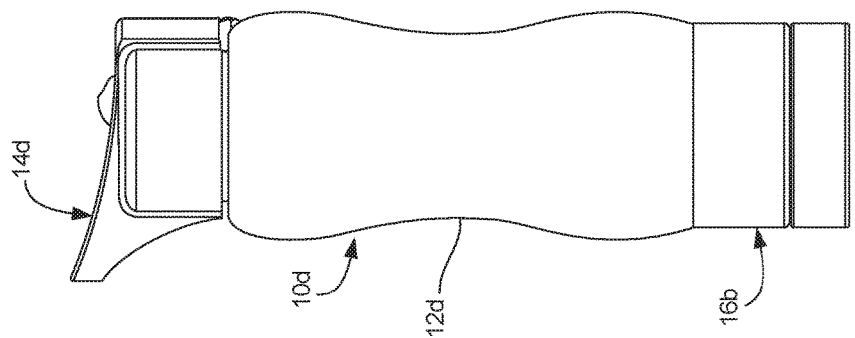
Fig. 8C
Fig. 8B
Fig. 8A

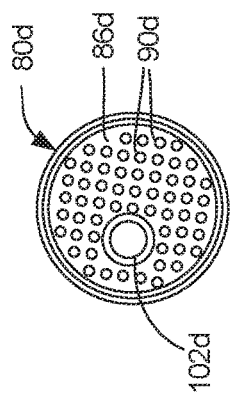
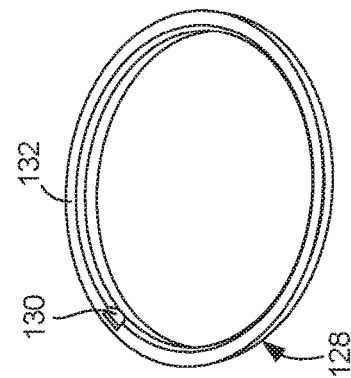
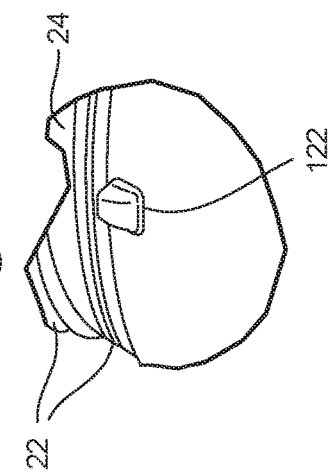
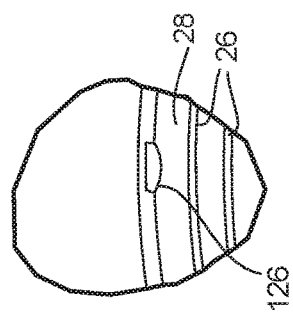
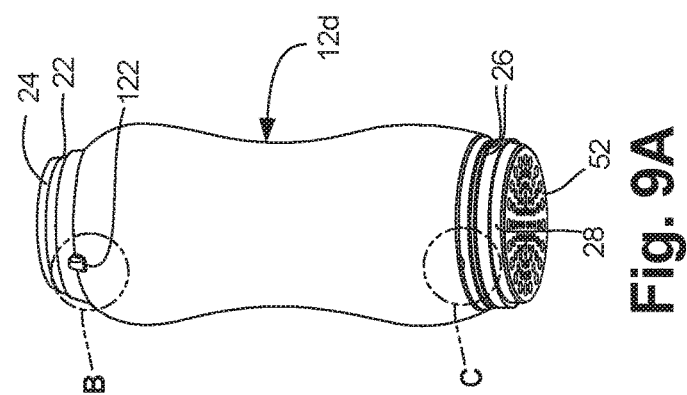

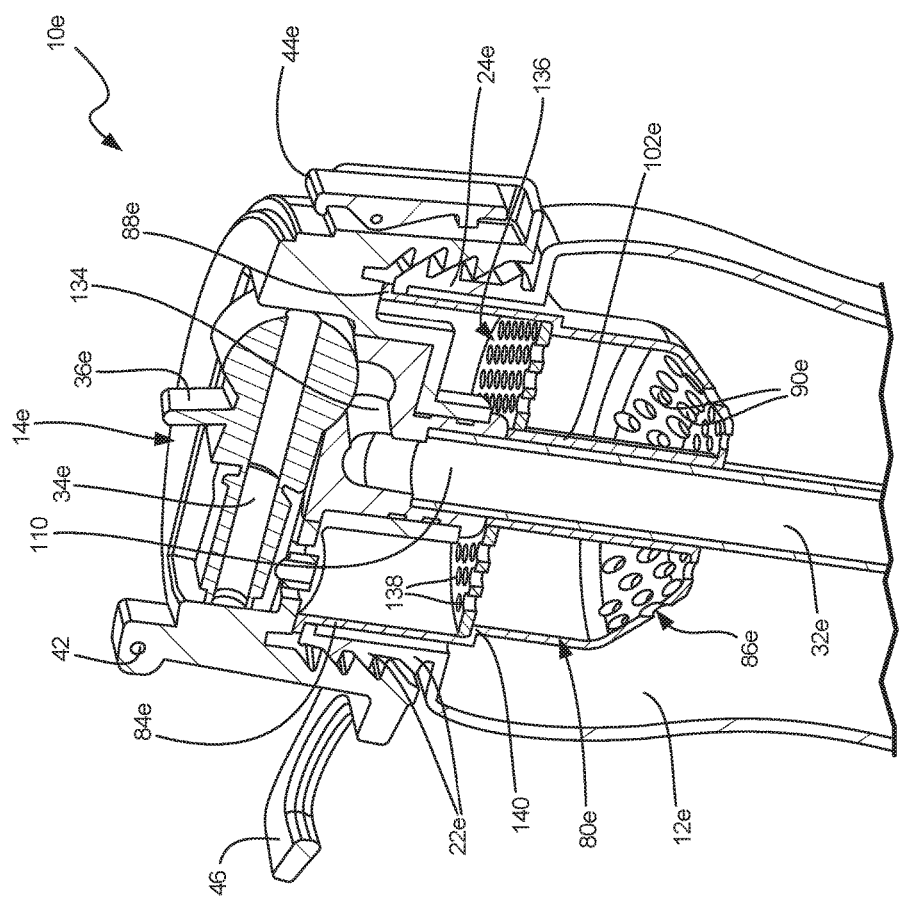

BOTTLE WITH FILTER AND INFUSION BASE

CROSS REFERENCE TO RELATED APPLICATIONS

This application claims the benefit of priority to U.S. Provisional Patent Application Ser. No. 62/200,345, filed on Aug. 3, 2015 and claims the benefit of priority to U.S. Provisional Patent Application Ser. No. 62/302,928, filed on Mar. 3, 2016. The contents of these applications are hereby incorporated in their entireties.

BACKGROUND

Water consumption is essential to health living, and a common recommendation calls for the consumption of at least eight cups of water daily. However, for many people, sweetened and carbonated drinks are more palatably enticing than water. These drinks include numerous disadvantages, including high caloric content and ingredients that may be undesirable from a health perspective, such as added coloring agents, preservatives, drugs such as caffeine, and other chemicals. One way to flavor water is by infusing it with fruit or other healthful foods. Large pitchers and other vessels may contain water as well as fruit such as lemons. Such fruit may contain seeds, which should be contained and not dispensed along with the flavored water. However, it is not convenient to bring along such large vessels when on-the-go.

Portable water bottles are known, and it is possible to include a piece of fruit in the bottle for infusing the fruit flavor into water also contained in the bottle. However, most known portable bottes do not offer a means for keeping undesirable elements, such as seeds, from being consumed with the flavored water.

Moreover, when the available water contains contaminants that impart an undesirable taste, such as iron, for example, including a small amount of fruit is sometimes insufficient for imparting a desirable taste to the water. Additionally, the available water may contain other contaminants including organic material such as algae, protozoa and mold; inorganic materials such as sediment; pathogens such as bacteria and viruses; or chemicals, for example, that could case water borne diseases in humans.

SUMMARY

In one aspect, a bottle assembly comprises a cap assembly, a bottle body, a base assembly and a filter assembly. The cap assembly comprises a straw. The bottle body is removably connectable to the cap assembly. The base assembly is removably connectable to the bottle body. The filter assembly is connectable to the bottle body, and the filter assembly comprises an aperture configured for passage of a portion of the straw. The aperture comprises a mechanism that is closable when the portion of the straw is not in the aperture.

In another aspect, a method of using a bottle comprises removing the cap assembly from an upper opening of the bottle body and introducing fluid into the upper opening of the bottle body and through a filter assembly, the filter assembly including an aperture configured for passage of a portion of the straw. The method also comprises closing the aperture.

In another aspect, a bottle assembly comprises a cap assembly, a bottle body, and a base assembly. The base assembly is removably connectable to the bottle body. The base assembly comprises a container and a cover removably connected to a portion of the container.

In yet another aspect, a method of using a bottle comprises placing a flavor enhancing element into a base assembly, attaching the base assembly to a bottle body to close a lower opening of the bottle body, and introducing fluid into an upper opening of the bottle body.

This disclosure, in its various combinations, either in apparatus or method form, may also be characterized by the following listing of items:

1. A bottle assembly comprising:
   a cap assembly comprising a straw;
   a bottle body removably connectable to the cap assembly;
   a base assembly removably connectable to the bottle body; and
   a filter assembly connectable to the bottle body, wherein the filter assembly comprises an aperture configured for passage of a portion of the straw, wherein the aperture comprises a mechanism that is closable when the portion of the straw is not in the aperture.
2. The bottle assembly of item 1, wherein the filter assembly is removable from the bottle body.
3. The bottle assembly of any of items 1-2, wherein the mechanism is a self-healing membrane.
4. The bottle assembly of any of items 1-3, wherein the mechanism comprises a plurality of overlapping flaps positioned at the aperture.
5. The bottle assembly of any of items 1-2, wherein the mechanism comprises a hinged cover.
6. The bottle assembly of any of items 1-5, wherein the mechanism comprises a flexible material.
7. The bottle assembly of any of items 1-6, wherein the filter assembly comprises:
   a filter housing; and
   a filter cartridge removably positioned at least partially within the filter housing.
8. The bottle assembly of item 7, wherein the filter cartridge comprises a shell filled with filter media.
9. The bottle assembly of item 8, wherein the shell is in the form of a generally cylindrical member having an aperture therethrough.
10. The bottle assembly of any of items 7-9, wherein the filter housing comprises an outer cylindrical wall and an inner cylindrical wall.
11. The bottle assembly of item 10, wherein the filter cartridge is configured to fill a space of the filter housing between the outer cylindrical wall and the inner cylindrical wall.
12. A bottle assembly comprising:
   a cap assembly;
   a bottle body removably connectable to the cap assembly; and
   a base assembly removably connectable to the bottle body, the base assembly comprising:
   a container; and
   a cover removably connected to a portion of the container.
13. The bottle assembly of item 12, further comprising a fluid permeable barrier positioned proximate an interface of the bottle body and the base assembly.
14. The bottle assembly of any of items 12-13, wherein the container comprises a plurality of stand-off walls positioned on a bottom surface of the container.
15. The bottle assembly of item 14, wherein at least one of the plurality of stand-off walls is configured as a cylindrical wall.

16. The bottle assembly of any of items 12-15, wherein the container comprises an upper peripheral portion and a lower peripheral portion separated by a groove.

17. The bottle assembly of item 16, wherein the lower peripheral portion comprises a plurality of flat tangential surfaces.

18. The bottle assembly of any of items 16-17, wherein the cover comprises an upper rim configured to mate with the groove.

19. The bottle assembly of any of items 12-18, wherein the cover comprises an aperture therethrough.

20. A method of using a bottle, the bottle comprising a cap assembly including a straw, the method comprising:
    removing the cap assembly from an upper opening of the bottle body;
    introducing fluid into the upper opening of the bottle body and through a filter assembly, the filter assembly including an aperture configured for passage of a portion of the straw; and
    closing the aperture.

21. The method of item 20, wherein closing the aperture occurs automatically.

22. The method of any of items 20-21, wherein closing the aperture occurs manually.

23. The method of any of items 20-22, wherein the filter assembly comprises:
    a filter housing; and
    a filter cartridge positioned at least partially within the filter housing, the method comprising:
    removing the filter cartridge from the filter housing and replacing the filter cartridge.

24. The method of any of items 20-23 further comprising attaching the cap assembly to the upper opening, including passing the portion of the straw through the aperture.

25. The method of item 24 further comprising drinking fluid from the bottle body through the straw.

26. A method of using a bottle comprising:
    placing a flavor enhancing element into a base assembly;
    attaching the base assembly to a bottle body to close a lower opening of the bottle body; and
    introducing fluid into an upper opening of the bottle body.

27. The method of item 26 further comprising preventing the flavor enhancing element from traveling into the bottle body.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 1A is a perspective view of an exemplary drinking bottle apparatus of the present disclosure.

FIG. 1B is a perspective view of a bottle body and cap portion of the bottle of FIG. 1A.

FIG. 1C is a perspective view of an exemplary base assembly.

FIG. 1D is a perspective view of a cap assembly, including a straw, removed from the bottle of FIG. 1A.

FIG. 1E is a side elevation view of a bottle body of the bottle FIG. 1A.

FIG. 1F is similar to FIG. 1C, with the fruit of FIG. 1C removed.

FIG. 4A is a perspective view of the exemplary drinking bottle apparatus including a filter assembly.

FIG. 4B is a perspective view of the partially disassembled bottle apparatus of FIG. 4A.

FIG. 4C is a partial vertical cross-sectional view of a portion of the bottle of FIG. 4B, wherein the bottle and filter housing are shown in cross-section and the straw and filter cartridge are shown in perspective.

FIG. 4D is a top view of the filter housing of FIGS. 4A-4C.

FIG. 4E is a top view of the filter housing of FIGS. 4A-4C and including an exemplary closable aperture mechanism.

FIG. 6 is a vertical cross-sectional view of a bottle, with the cap assembly removed, including another embodiment of a filter housing and filter cartridge therein.

FIG. 7A is a perspective view of the filter housing of FIG. 6.

FIG. 7B is a side elevation view of the filter housing of FIG. 7A.

FIG. 7C is a top view of the filter housing of FIG. 7A.

FIG. 8A is a side elevation view of a second exemplary embodiment of a drinking bottle.

FIG. 8B is a front elevation view of the drinking bottle of FIG. 8A.

FIG. 8C is a vertical cross-sectional view of the drinking bottle taken along line C-C of FIG. 8B.

FIG. 9A is a perspective view of the bottle body of the drinking bottle of FIGS. 8A-8C.

FIG. 9B is a view of an enlarged encircled area "B" of FIG. 9A.

FIG. 9C is a view of an enlarged encircled area "C" of FIG. 9A.

FIG. 9D is a perspective view of an exemplary gasket between the bottle body and base assembly.

FIG. 10 is a top view of the filter housing of the second exemplary embodiment of a drinking bottle.

FIG. 11 is a partial perspective bi-secting vertical cross-sectional view of a third exemplary embodiment of a drinking bottle.

Figure 2B:
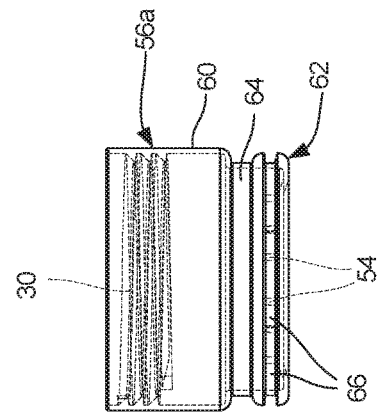
FIG. 2B is a side elevation view of the base container of FIG. 2A.
Figure 2D:
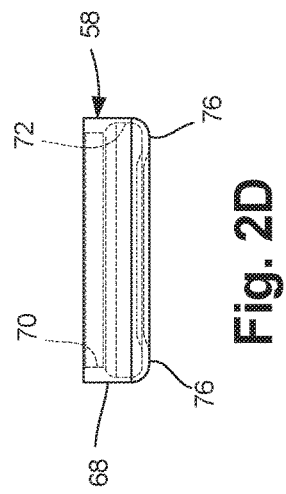
FIG. 2D is a side elevation view of the base cover of FIG. 2C.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

FIG. 1A is a perspective view of an exemplary embodiment of a drinking bottle assembly 10. Bottle 10 includes bottle body 12, removable cap assembly 14 and removable base assembly 16. In an exemplary embodiment, base assembly 16 includes container 56 and removable bottom cover 58. FIGS. 1B and 1C show base assembly 16 detached from bottle body 12, and with base cover 58 shown as transparent. As shown in FIG. 1E, bottle body 12 is a double-ended body having upper opening 18 and lower opening 20. Cap 14 is detachably connected to bottle body 12 proximate upper opening 18, and base assembly 16 is detachably connectable to bottle body 12 proximate lower opening 20. In an exemplary embodiment, such connections are provided by threads 22 positioned on upper neck 24 and threads 26 positioned on lower neck 28. Threads 26 cooperate with threads 30 of base assembly 16, and threads 22 cooperate with internal threads on cap assembly 14 (not visible). A gasket, O-ring, or other sealing device can also be provided at the interface between bottle body 12 and either or each of cap assembly 14 and base assembly 16.

In the illustrated embodiment, cap assembly 14 includes straw 32 that is selectively in fluid communication with sipper valve 34. In the illustrated embodiment, straw 32 is fixed to cap assembly 14 such that removal of cap assembly 14 from bottle body 12 also removes straw 32 from bottle body 12. Conversely, attachment of cap assembly 14 to bottle body 12 also introduces straw 32 into bottle body 12. FIG. 1A shows a configuration wherein sipper valve 34 is closed off from communication with straw 32. In contrast, FIG. 1D shows a configuration wherein sipper valve 34 is in fluid communication with straw 32 (i.e., in an open configuration). Sipper valve 34 is manipulated between the closed and opened positions by pivoting lever assembly 36 about a horizontal axis in pivot directions 38. In the illustrated embodiments, cap assembly 14 includes a lid 40 that is shown in an open position. Lid 40 can be pivoted closed about hinge pin 42 and held in the closed position with latch 44 when sipper valve 34 is in the closed position shown in FIGS. 1A and 1B. In an exemplary embodiment, cap 14 also includes a carrying handle 46 including aperture 48. The provision of cap assembly 14 with straw 32 and sipper valve 34 prevents spillage of a large volume of fluid, even if bottle 10 is unintentionally inverted.

In the illustrated embodiment, base assembly 16 is removably attachable to bottle body 12 and is configured to contain a flavor enhancing element 50 such as the illustrated fruit slices. Any variety of edible flavor enhancing elements can be used, such as, for example, cut food portions. In the illustrated embodiment, an optional fluid permeable barrier 52 is provided at lower opening 20, proximate an interface of the bottle body 12 and the base assembly 16. In an exemplary embodiment, fluid permeable barrier 52 is in the form of a plate or disc having a plurality of apertures 53 therethrough. When used, fluid permeable barrier prevents flavor element 50 from entering bottle body 12, while still permitting fluid infused with flavor particles to flow freely between base assembly 16 and bottle body 12. Use of such a fluid permeable barrier 52 is especially suitable when the flavor enhancing element 50 includes elements such as seeds that may plug straw 32 if permitted into bottle body 12. In another embodiment, fluid permeable barrier 52 is not provided, and flavor enhancing element 50 is allowed to travel into bottle body 12. As shown in FIG. 1F, container 56 in an exemplary embodiment includes a plurality of stand-off walls 54 extending upward from bottom surface 55, to allow fluid to more easily flow under and around flavor enhancing element 50, as shown in FIG. 1C.

In an exemplary method of use of drinking bottle 10, a user inserts a flavor enhancing element 50 into base assembly 16 and connects base assembly 16 to bottle body 12 by threading base assembly 16 onto lower neck 28 of bottle body 12. The user can then pour water or another potable fluid into upper opening 18 of bottle body 12 before inserting straw 32 of cap assembly 14 into upper opening 18. The user in an exemplary method connects cap assembly 14 to bottle body 12 by threading cap assembly 14 onto upper neck 24, resulting in the assembled drinking bottle 10, shown in FIG. 1A. By shaking or otherwise agitating the fluid within bottle 10, and/or allowing for passage of a period of time, juices and other flavor particles from flavor enhancing element 50 are infused into the fluid in the bottle body 12. To consume the flavored fluid, the user opens sipper valve 34 to the configuration shown in FIG. 1D and drinks therefrom. While an exemplary method of use has been described, it is understood that the described steps may be performed in a different chronological order than provided. Moreover, with cap assembly 14 assembled onto bottle body 12, the fluid to be contained may be introduced through lower opening 20, rather than upper opening 18, of bottle body 12.

Figure 2A:
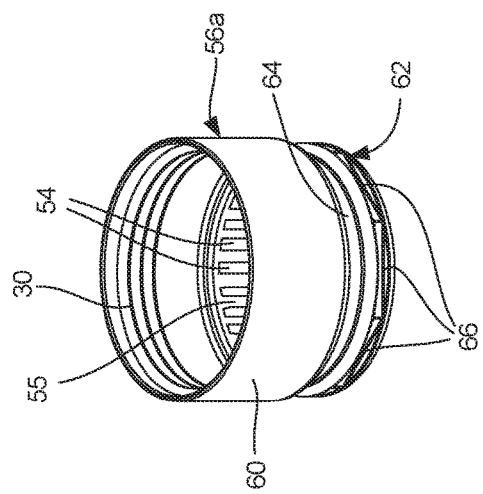
FIG. 2A is an exemplary embodiment of a base container of the base assembly of FIGS. 1C and 1F.
Figure 2C:
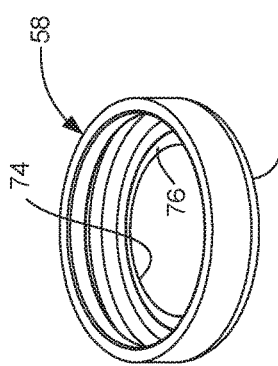
FIG. 2C is a perspective view of an exemplary embodiment of a base cover of the base assembly of FIG. 1A.

As shown in FIG. 1A and FIGS. 2A through 2D, in an exemplary embodiment, base assembly 16 includes container 56 and bottom cover 58. In FIGS. 1A, 1C, and 1F, container 56 and base cover 58 are illustrated as optically transparent or clear. In FIGS. 2A and 2B, container 56a is illustrated as opaque, in order to more clearly show its structural features. In an exemplary embodiment, an exterior of container 56 includes an upper peripheral portion 60 separated from a lower peripheral portion 62 by groove 64. In an exemplary embodiment, lower peripheral portion 62 includes substantially flat tangential surfaces 66, which allow a user or machine to more easily grip container 56 in a manner to prevent rotation thereof.

In an exemplary embodiment, bottom cover 58 is rendered in a flexible, slip resistant material such as rubber or silicone, for example. In the illustrated embodiment, bottom cover 58 includes a side wall 68 having a relatively thicker upper rim 70 and a relatively thinner lower side wall portion 72. When bottom cover 58 is attached to container 56, lower side wall portion 72 of bottom cover 58 surrounds lower peripheral portion 62 of container 56. Upper rim 70 of bottom cover 58 extends into and mates with groove 64 of container 56. In an exemplary embodiment, bottom cover 58 includes aperture 74 therethrough, thereby allowing for material savings, while still providing slip resistance at least at circumferential bottom region 76 of bottom cover 58.

Figure 3C:
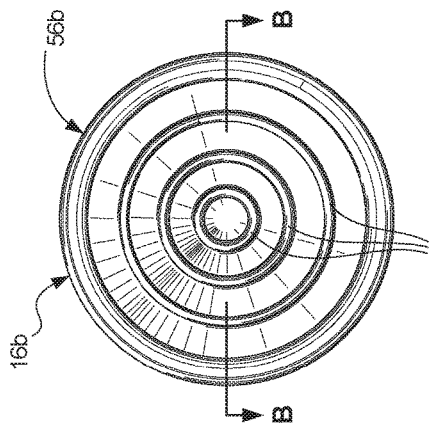
FIG. 3C is a top view of the base assembly of FIG. 3A.
Figure 3B:
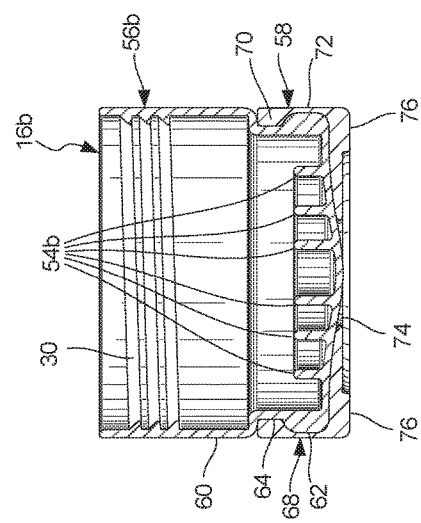
FIG. 3B is a cross-sectional elevation view of the base assembly of FIG. 3A, taken along line B-B of FIG. 3C.
Figure 3A:
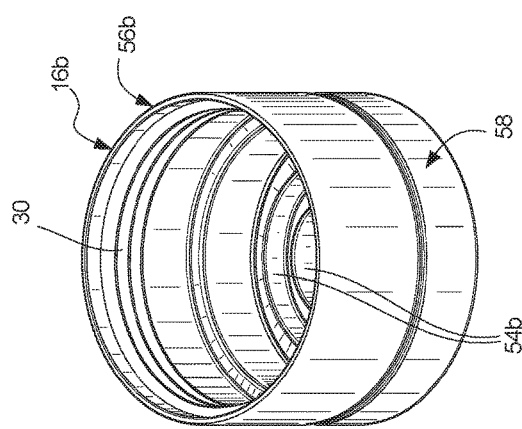
FIG. 3A is a perspective view of an alternative embodiment of a base assembly.

FIGS. 3A through 3C show a second exemplary embodiment of a base assembly 16b, showing a second configuration of stands off walls 54b, illustrated as cylindrical walls oriented as concentric rings. It is to be understood that any configuration and number of stand-off walls may be used to permit fluid to flow between bottom surface 55 of container 56 and a flavor enhancing element 50 placed into container 56. Moreover, it is contemplated that stand off walls 54, 54b may be eliminated if desired.

FIG. 4A is similar to FIG. 1A, but shows bottle 10 with a filter assembly 78. In an exemplary embodiment, filter assembly 78 includes a removable filter housing 80 configured to at least partially contain a removable and replaceable filter cartridge 82. In the illustrated embodiment, filter housing 80 includes a substantially cylindrical side wall 84, perforated bottom wall 86, and retention lip 88. As shown in FIG. 4C, filter housing 80 is removably inserted into upper opening 18 of bottle body 12 by inserting cylindrical side wall of 80 into upper neck 24 of bottle body 12 and placing radially outwardly extending retention lip 88 on the upper neck 24. In an exemplary embodiment, bottom wall 86 includes a plurality of perforations or apertures 90 to allow fluid to flow from an interior of filter housing 80 into bottle body 12. The number, size, and placement of apertures 90 can vary widely to provide a suitable rate of fluid flow therethrough. Providing larger and/or more apertures 90 results in a faster flow rate through filter housing 80, which is especially suitable when it is contemplated that the filter assembly 78 will be used with fluid that contains a low level of contaminants. Providing smaller and/or fewer apertures 90 results in a slower flow rate through filter housing 80, which requires more patience from the user but is especially suitable when it is contemplated that the filter assembly 78 will be used with fluid that contains a relatively higher level of contaminants; increasing the residence time of the fluid in contact with filter media 98 increases the removal of contaminants. In an exemplary embodiment, bottom wall 86 includes aperture 92 therethrough to accommodate the passage of a portion of straw 32. In an exemplary embodiment, aperture 92 includes a closeable mechanism or seal 94, described in more detail below, to reduce or prevent leakage through aperture 92 when straw 32 is removed therefrom. Closeable seal 94 may include a self-healing membrane or other closeable structure.

Filter cartridge 82 in an exemplary embodiment is a removable and replaceable cartridge having a generally cylindrical doughnut or toroidal shape with an aperture therethrough (defined by inner cylindrical wall 116) to accommodate the passage of a portion of straw 32. In an exemplary embodiment, filter cartridge 82 includes a shell 96 filled with filter media 98. In an exemplary embodiment, shell 96 is formed of a light-weight, fluid-permeable material that retains its strength in water. Suitable materials for shell 96 include wood pulp and other natural and synthetic fiber-based paper and textile (woven and non-woven) materials, such as those commonly used for tea bags and coffee ground filters, for example. An especially suitable configuration for shell 96 includes substantially flat upper surface 112, substantially flat lower surface 114, inner cylindrical wall 116, and outer cylindrical wall 118. Filter media 98 can include a wide range of granular and pelletized filter media, for example. Suitable media include granular activated carbon, coconut, other known media, and mixtures thereof.

Filter cartridge 82 is sized and shaped to fit snugly into filter housing 80; this prevents fluid flowing through filter housing 80 from bypassing filter cartridge 82. In an exemplary embodiment, filter cartridge 82 is designed to be replaced more often than filter housing 80. Filter cartridge 82 is designed to have a life cycle dependent upon the volume and type of filter media 98, the volume of fluid passed therethrough, and the amount and type of contaminants contained in the fluid, among other factors. In an exemplary embodiment, a flow rate through filter assembly 78 is about 1 gallon per minute, with a life of up to about 50 liters of fluid.

Filter housing 80, on the other hand, is designed to be more durable. In an exemplary embodiment, filter housing 80 is made from a non-porous, light-weight material such as high density polyethylene or other plastic. In one embodiment, filter housing 80 is transparent, to allow a user to easily visually assess a condition of filter cartridge 82 that is contained in filter housing 80. It is contemplated that a user can wash filter housing 80 repeatedly to remove debris and scale that may collect on the surfaces thereof and in apertures 90. However, where such cleaning may be inconvenient or ineffective, filter housing 80 is also easily removed from the neck 24 of bottle body 12 for replacement.

FIGS. 4D and 4E show top views of the filter housing 80. In FIG. 4E, a particular embodiment of closable seal 94 is shown, although it is contemplated that other mechanisms may be used. In the embodiment of filter housing 80a shown in FIG. 4E, closable seal 94a is made from a food-grade thermoplastic elastomer, silicone, or other flexible material and includes a plurality of flexible flaps 100, which by virtue of their construction and material, are biased to overlap (in a horizontal orientation, substantially parallel to bottom wall 86) as shown to close aperture 92. When straw 32 is inserted through aperture 92, flaps 100 are flexible enough to bend in the insertion direction to allow the passage of straw 32 through aperture 92, as shown in FIGS. 4B and 4C. When straw 32 is withdrawn from aperture 92, such as by removing cap assembly 14 (as shown in FIG. 1D) when filter assembly 78 is retained on bottle body 12, flaps 100 rebound to their horizontal orientation to automatically close aperture 92. Thus, when a user introduces fluid such as water into filter assembly 78, the water is retained in filter housing 80 for filtration of undesirable contaminants therefrom through filter cartridge 82 before dripping through perforations 90 and into bottle body 12.

Figure 5B:
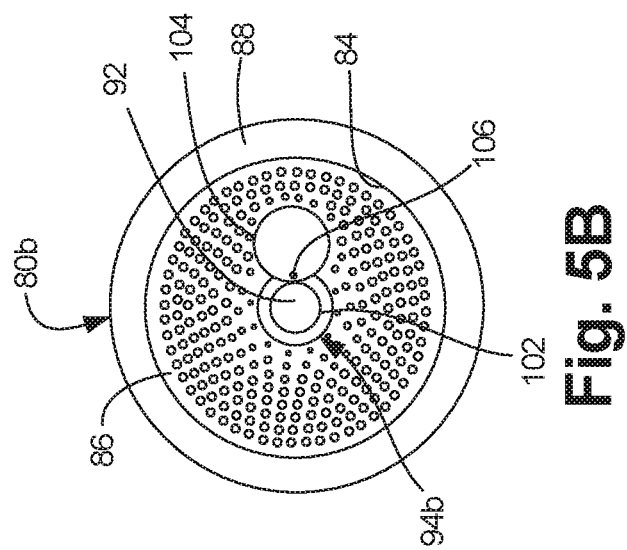
FIG. 5B is a top view of the filter housing of FIG. 5A.
Figure 5A:
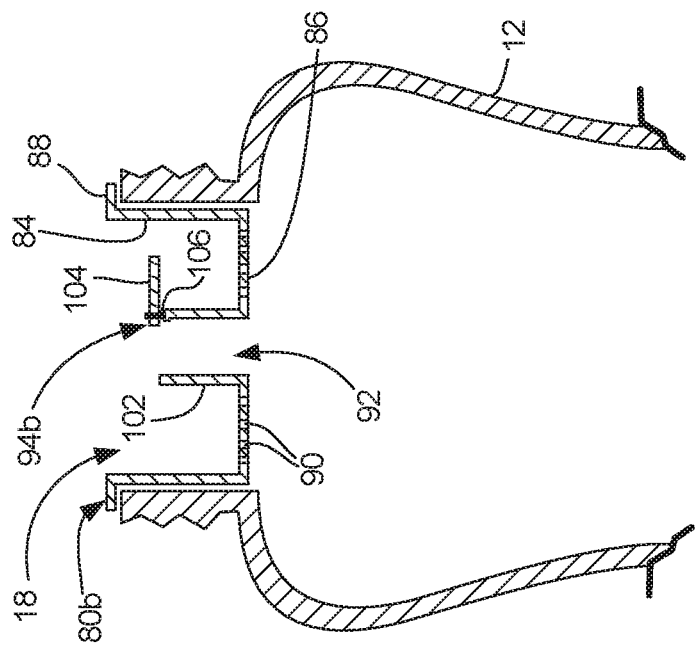
FIG. 5A is a partial vertical cross-sectional view of a portion of a bottle and another exemplary embodiment of a filter housing with a closable central aperture.

FIGS. 5A and 5B show another embodiment of filter housing 80b having another configuration of closable seal 94b. Filter housing 80b includes inner annular wall 102. A closable hinged cover 104 of closable seal 94b is positioned at a top surface of inner annular wall 102. In FIGS. 5A and 5B, cover 104 is shown in an open position, as would be appropriate to allow for the passage of straw 32 through aperture 92. In an exemplary method of use, to fill bottle 10, a user could remove cap assembly 14, including straw 32, from bottle body 12. Then, the user could manually close aperture 92 by pivoting cover 104 about hinge pin 106 over aperture 92. The user could then introduce water or other potable fluid into opening 18 of bottle body 12. In use, a filter cartridge 82 (not shown) would be held in filter housing 80b on floor 86 between side wall 84 and inner annular wall 102 and preferably below the level of cover 104. The water would flow over cover 104 and into the filter cartridge 82, for filtration of undesirable elements therefrom, before flowing through apertures 90 and into bottle body 12. The user could then open cover 104, replace cap assembly 14 (including inserting straw 32 through inner annual wall 102 and aperture 92) and drink fluid from bottle body 12 through straw 32 and sipper valve 34.

In an alternative method of use of the bottles shown in FIGS. 4A-5B, the user can withdraw cap assembly 14 from bottle body 12 only partially (as shown in FIG. 4C, for example), so that a lower portion of straw 32 is retained within aperture 92. In that case, the inserted portion of straw 32 serves to seal aperture 92, ensuring that liquid introduced into opening 18 flows through filter cartridge 82 before flowing through apertures 90 and into bottle body 12. Moreover, in this method of use, the straw 32 (especially when sipper valve 34 is in the open position) serves as a vent to allow air that is displaced by the entering fluid to be released outside the bottle body 12.

FIGS. 6 and 7A-7C show an alternative embodiment of a filter housing 80c that is manufactured to conform to an interior contour of a top portion of bottle body 12 and is not intended for removal and replacement. Features of filter housing 80c that are similar to those discussed above are similarly numbered, and the descriptions set forth above also apply to the features of filter housing 80c.

FIG. 8A is a side elevation view of a second exemplary embodiment of a drinking bottle 10d. FIG. 8B is a front elevation view of the drinking bottle 10d. FIG. 8C is a vertical cross-sectional view of the drinking bottle 10a taken along line C-C of FIG. 8B. Generally, bottle 10d is similar to bottle 10d described above, with some changes in product configuration. For example, cap assembly 14d does not have a separate lid 40 and has a different shape than cap assembly 14 of drinking bottle 10. Moreover, drinking bottle 10d includes detent mechanisms 120 at connections between bottle body 12d and cap assembly 14d and between bottle body 12d and base assembly 16b (please also refer to FIGS. 9A-9D).

As shown in FIG. 8B, detent mechanism 120 between bottle body 12d and cap assembly 14d includes, in an exemplary embodiment, protrusion 122 on bottle body 12d and cooperating fin 124 on cap assembly 14d. It is contemplated that the positions of these detent elements may be transposed. For example, a protrusion could be provided on the cap assembly 14d and a cooperating fin on bottle body 12d. Moreover, while a specific embodiment of detent mechanism 120 is described having protrusion and fin structures, it is contemplated that other forms of detent mechanisms may also be suitable. For example, detent mechanisms incorporating cooperating pin and groove structures, protrusion and recess structures, and other snap-fit and interference-fit structures would also be suitable.

In the embodiment of detent mechanism 120 illustrated in FIG. 8B, cap assembly 14d is attached to bottle body 12d by threading cap assembly 14d onto threads 22 of upper neck 24 of bottle body 12d. In the illustrated embodiment, such attachment is achieved by rotating cap assembly 14d in a clockwise direction (as viewed from a top of bottle 10d) with respect to bottle body 12d. On a final rotation, fin 124 moves past protrusion 122 and is retained thereby to prevent unintentional separation of cap assembly 14d from bottle body 12d. Moreover, such passage of fin 124 past protrusion 122 in an exemplary embodiment requires some force by the user, resulting in tactile and auditory feedback that an affirmative connection between cap assembly 14d and bottle body 12d has been achieved. In an exemplary embodiment, the required force results in resilient deformation of any or all of fin 124, cap assembly 14d, protrusion 122, and bottle body 12d, thereby accommodating the mutual engagement and release between fin 124 and protrusion 122.

FIG. 9A is a perspective view of the bottle body 12d of drinking bottle 10d. FIG. 9B is a view of an enlarged encircled area "B" of FIG. 9A. FIG. 9C is a view of an enlarged encircled area "C" of FIG. 9A. FIG. 9D is a perspective view of an exemplary gasket between the bottle body 12d and base assembly 16b. With reference to FIGS. 8C, 9A, 9C and 9D, an exemplary detent mechanism is provided between bottle body 12d and base assembly 16b. FIG. 9C shows a protrusion 126 provided on bottle body 12d proximate lower neck 28 of bottle body 12d. As shown in FIGS. 8C and 9C, sealing gasket 128 is provided at the top of container 56b of base assembly 16b. In an exemplary embodiment, sealing gasket 128 includes recess 130 that is formed to accept the insertion of protrusion 126. Accordingly, when bottle body 12d and base assembly 16b are assembled together at a connection including threads 16 at lower neck 28 of bottle body 12d, in a final rotation, protrusion 126 presses against the top surface 132 of gasket 128 until protrusion 126 is aligned with recess 130. At that point, the user receives tactile feedback, in the form of additional rotational resistance, that the bottle body 12d and base assembly 16b are properly secured together. Moreover, the fit of protrusion 126 in recess 130 prevents unintentional separation of the bottle body 12d and base assembly 16b. Such rotation of protrusion 126 against top surface 132 requires some force by the user; when protrusion 126 falls into recess 130, the user receives tactile feedback that an affirmative connection between base assembly 16b and bottle body 12d has been achieved. In an exemplary embodiment, the required force results in resilient deformation of any or all of gasket 128, protrusion 126, and bottle body 12d, thereby accommodating the mutual engagement and release between protrusion 126 and recess 130 of gasket 128.

While a specific embodiment of the detent mechanism comprising protrusion 126 and recess 130 is described, it is contemplated that other forms of detent mechanisms may also be suitable. Moreover, while the exemplary detent mechanism has cooperating features on bottle body 12 and gasket 128, it is also contemplated that a detent mechanism can additionally or alternatively have cooperating features on bottle body 12 and container 56. Other suitable detent mechanisms include, for example, those incorporating cooperating fin and protrusion structures, pin and groove structures, other protrusion and recess structures, and other snap-fit and interference-fit structures.

FIG. 10 is a top view of the filter housing 80d of the second exemplary embodiment of a drinking bottle 10d. Filter housing 80d includes a different placement of inner annular wall 102d to accommodate the offset placement of straw 32d in drinking bottle 10d (as shown in FIG. 8C). Moreover, filter housing 80d includes a different configuration and arrangement for apertures 90d.

FIG. 11 is a partial perspective bi-secting vertical cross-sectional view of a third exemplary embodiment of a drinking bottle 10e. Filter housing 80e is relatively deeper than the previously illustrated filter housings, allowing it to hold a relatively larger and deeper filter cartridge 82 (not shown). In the illustrated embodiment, straw 32e is substantially centered in bottle body 12e, while sipper valve 34e and lever assembly 36e are offset from the center. Accordingly, conduit 134 provides for fluid communication between sipper valve 34e and the top 110 of straw 32e when lever assembly 36e is moved to position sipper valve 34e in the "open" position (as shown in FIG. 1D, for example). A filter cartridge (not shown) is configured to be contained in filter housing 80e above bottom wall 86e. Optionally, screen 136 having apertures 138 therethrough is a removable element that rests on shoulder 140 of cylindrical side wall 84e and may simply be dropped into, and lifted out of, filter housing 80e. Where screen 136 is provided, the filter cartridge may be positioned above bottom wall 86e and below screen 136. Bottom wall 86e has a downwardly extending funnel shape, which slows the flow of fluid by gravity through filter housing 80e, thereby increasing the residence time of the fluid in the filter cartridge and increasing filtration efficiency.

The various embodiments of disclosed drinking bottle 10, 10d, 10e provide a user with filtered water, passed through filter assembly 78, that is infused with flavor from an optional flavor enhancing element 50 placed in base assembly 16, 16b. Bottle 10, 10d, 10e also allows the user to drink directly from the bottle body 12, 12d, 12e through straw 32, 32d, 32e, which is in fluid communication with an interior of bottle body 12, 12d, 12e at a lower end 108 of straw 32, 32d, 32e and operably connected to sipper valve 34, 34d, 32e at an upper end 110 of straw 32, 32d, 32e.

This disclosure is directed in particular to a portable drinking bottle, and exemplary dimensions are hereby provided. It is to be understood that the bottle and its components can also be offered in other suitable sizes, shapes and configurations. A height of bottle body 12 is about 9.2 inches. A diameter of base assembly 16 is about 3 inches. A height of container 56 of base assembly 16 is about 2.125 inches. A height of filter housing 80 is about 1.9 inches. A diameter of straw aperture 92 is about 11 mm. Filter cartridge 82 has an outer diameter of about 1.9 inches, an inner diameter of about 0.6 inches, and a height of about 0.4 inches.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A bottle assembly including:
   a cap assembly including a straw;
   a bottle body removably connectable to the cap assembly;
   a base assembly removably connectable to the bottle body; and
   a filter assembly connectable to the bottle body, wherein the filter assembly includes:
      an aperture configured for passage of a portion of the straw, wherein the aperture comprises a mechanism that is closable when the portion of the straw is not in the aperture; and
      a filter housing having an outer wall, wherein the outer wall is separated into an upper portion and a lower portion by a shoulder that extends inward toward the aperture so that the upper portion has a larger radial dimension than the lower portion.

2. The bottle assembly of claim 1, wherein the mechanism includes a hinged cover.

3. The bottle assembly of claim 1, wherein the mechanism includes a flexible material.

4. The bottle assembly of claim 1, wherein the filter assembly includes a filter cartridge removably positioned at least partially within the filter housing.

5. The bottle assembly of claim 4, wherein the filter housing includes an inner cylindrical wall surrounding the aperture.

6. The bottle assembly of claim 5, wherein the filter cartridge is configured to fill a space of the filter housing between the outer wall and the inner cylindrical wall.

7. The bottle assembly of claim 1, wherein the straw is substantially centered in the bottle body when the cap assembly is connected to the bottle body, the cap assembly further including a sipper valve that is offset from a center of the bottle body.

8. The bottle assembly of claim 1 further including a screen positioned on the shoulder.

9. The bottle assembly of claim 8 further including a filter cartridge positioned in the filter housing below the screen.

10. A bottle assembly including:
    a cap assembly;
    a bottle body removably connectable to the cap assembly;
    a base assembly removably connectable to the bottle body, the base assembly including:
       a container with a bottom surface; and
       a cover removably connected to a bottom portion of the container and disposed at least partially below the bottom surface; and
    a filter housing receivable within the bottle body and having a bottom wall with a downwardly extending funnel shape.

11. The bottle assembly of claim 10, further including a fluid permeable barrier positioned proximate an interface of the bottle body and the base assembly.

12. The bottle assembly of claim 10, wherein the container includes a plurality of stand-off walls positioned on a bottom surface of the container.

13. The bottle assembly of claim 12, wherein at least one of the plurality of stand-off walls is configured as a cylindrical wall.

14. The bottle assembly of claim 10, wherein the container includes an upper peripheral portion and a lower peripheral portion separated by a groove.

15. The bottle assembly of claim 14, wherein the lower peripheral portion includes a plurality of flat tangential surfaces.

16. A method of using a bottle, the bottle including:
    a cap assembly including a straw;
    a filter housing having an outer wall, wherein the outer wall is separated into an upper portion and a lower portion by a shoulder that extends inward toward the straw;
    a screen positioned on the shoulder; and
    a filter cartridge disposed in the lower portion;
    the method including:
       removing the cap assembly and straw from an upper opening of the bottle body;
       introducing fluid into the upper opening of the bottle body;
       containing the fluid within the upper portion of the outer wall of the filter housing before the fluid flows through the screen and the filter cartridge disposed in the lower portion of the outer wall of the filter housing, the filter housing including an aperture configured for passage of a portion of the straw; and
    closing the aperture.

17. The method of claim 16, wherein closing the aperture occurs automatically.

18. The method of claim 16, wherein closing the aperture occurs manually.

19. The method of claim 16, including removing the filter cartridge from the filter housing and replacing the filter cartridge.

20. The method of claim 19 further including removing the screen before removing the filter cartridge.

* * * * *